United States Patent
Mask

(10) Patent No.: US 9,342,884 B2
(45) Date of Patent: May 17, 2016

(54) SYSTEMS AND METHODS OF MONITORING WASTE

(71) Applicant: Cox Enterprises, Inc., Atlanta, GA (US)

(72) Inventor: Keith A. Mask, Atlanta, GA (US)

(73) Assignee: Cox Enterprises, Inc., Atlanta, GA (US)

( * ) Notice: Subject to any disclaimer, the term of this patent is extended or adjusted under 35 U.S.C. 154(b) by 0 days.

(21) Appl. No.: 14/697,775

(22) Filed: Apr. 28, 2015

(65) Prior Publication Data

US 2015/0348252 A1 Dec. 3, 2015

Related U.S. Application Data

(60) Provisional application No. 62/003,997, filed on May 28, 2014.

(51) Int. Cl.
*G06K 9/00* (2006.01)
*G06T 7/00* (2006.01)

(52) U.S. Cl.
CPC ............ *G06T 7/003* (2013.01); *G06K 9/00201* (2013.01); *G06T 7/0022* (2013.01); *G06T 2207/10016* (2013.01); *G06T 2207/30232* (2013.01)

(58) Field of Classification Search
None
See application file for complete search history.

(56) References Cited

U.S. PATENT DOCUMENTS

| | | | |
|---|---|---|---|
| 6,561,085 B1 * | 5/2003 | Durbin | B30B 9/3007 100/229 A |
| 7,139,406 B2 * | 11/2006 | McClelland et al. | B64F 1/368 340/600 |
| 8,056,817 B2 * | 11/2011 | Flood | B30B 9/3007 235/435 |
| 8,600,149 B2 * | 12/2013 | Song | G01N 23/04 378/57 |
| 8,602,298 B2 * | 12/2013 | Gonen | B65F 1/1484 235/380 |
| 8,727,492 B2 * | 5/2014 | Mihara | B41J 2/1721 347/36 |
| 2005/0036689 A1 * | 2/2005 | Mahdavieh | G01V 5/0008 382/199 |
| 2006/0049930 A1 * | 3/2006 | Zruya | G08B 13/19602 340/500 |
| 2007/0122003 A1 * | 5/2007 | Dobkin | G08B 13/19608 382/115 |
| 2008/0198021 A1 * | 8/2008 | Flood | B30B 9/3007 340/572.7 |
| 2009/0161907 A1 * | 6/2009 | Healey | B65F 1/14 382/100 |
| 2010/0046704 A1 * | 2/2010 | Song | G01N 23/04 378/57 |
| 2010/0071572 A1 * | 3/2010 | Carroll | B30B 9/3042 100/229 A |
| 2014/0376686 A1 * | 12/2014 | Dreiseitel | G01V 5/005 378/5 |
| 2015/0294431 A1 * | 10/2015 | Fiorucci | G06Q 50/26 705/13 |
| 2015/0310606 A1 * | 10/2015 | Shreve | G06T 7/004 382/103 |

* cited by examiner

*Primary Examiner* — Avinash Yentrapati
(74) *Attorney, Agent, or Firm* — Sutherland Asbill & Brennan LLP

(57) ABSTRACT

Systems, methods, and computer-readable media are disclosed for monitoring waste. Example methods may include monitoring a waste compartment of a waste container, the waste compartment configured to receive waste items, and determining a waste level of waste items in the waste compartment. Methods may include identifying a waste haul threshold indicative of a predetermined waste level at which a waste haul notification is triggered, determining that the waste level meets the waste haul threshold, and triggering the waste haul notification indicating that the waste container is to be emptied based at least in part on the waste level.

20 Claims, 8 Drawing Sheets

SYSTEMS AND METHODS OF MONITORING WASTE

BACKGROUND

Waste hauling and pickups are generally scheduled on a regular basis, regardless of the amount or fill level of waste in a waste container. Generally, for each such pickup, the customer is charged for pickup and disposal of a full waste container (e.g., for 40 cubic yards of waste) regardless of the amount or volume of waste actually present in the container. Additionally, at times, users and/or third parties may dump restricted or illegal waste products into a dumpster, which may result in fines or penalties levied against the owner of the waste container. In some instances, waste containers may be overfilled, which can also result in fines and/or penalties. Accordingly, systems and methods for monitoring waste may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
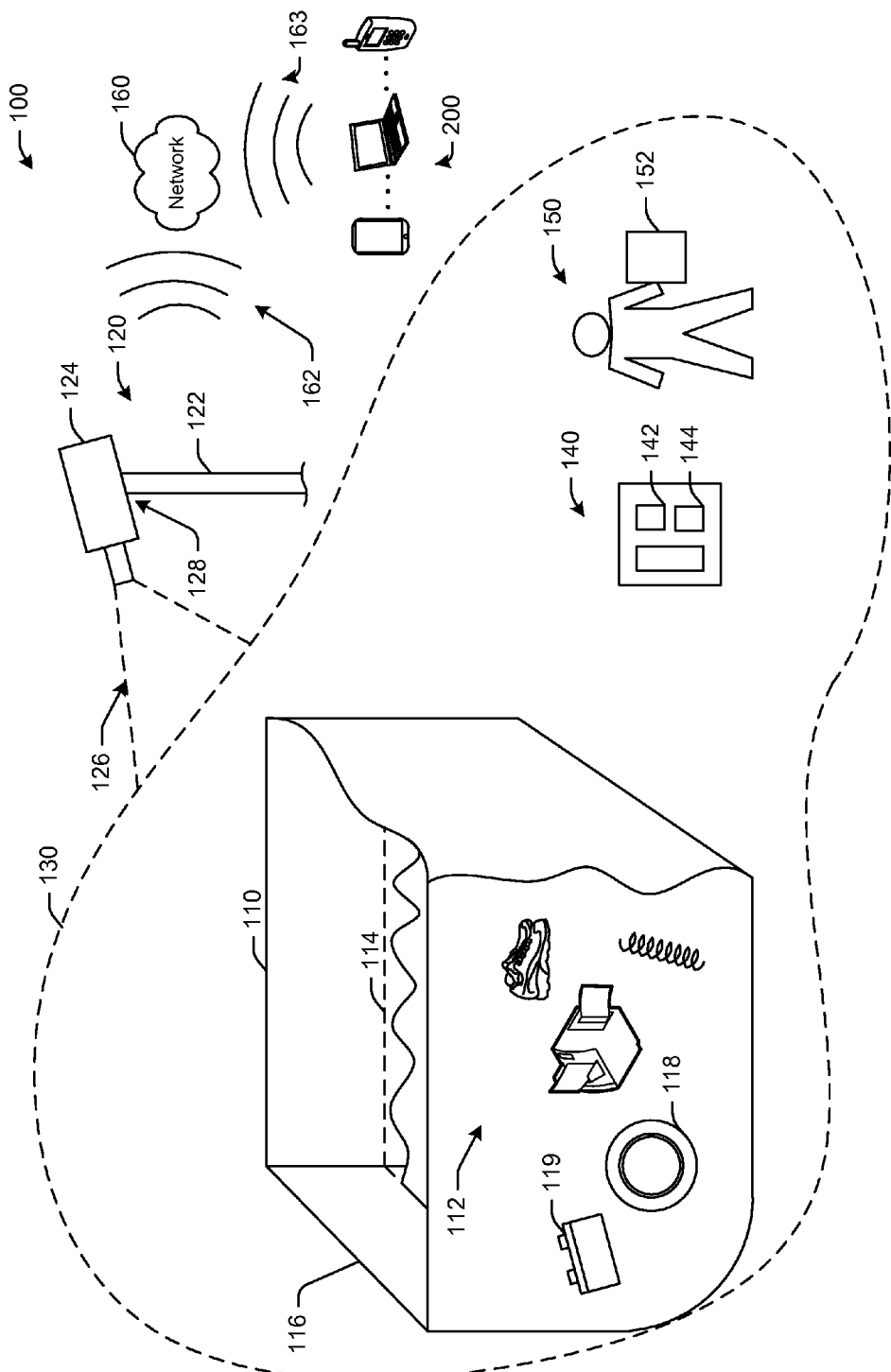
FIG. 1 is an illustration of a waste monitoring system, according to an embodiment of the disclosure.

In the following description, numerous specific details are set forth. However, it should be understood that embodiments of the present disclosure may be practiced without these specific details. In other instances, well-known methods, structures, and techniques have not been shown in detail in order not to obscure an understanding of this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Furthermore, the repeated use of the phrase "in one embodiment" does not necessarily refer to the same embodiment, although it may.

As used herein, unless otherwise specified, the use of the ordinal adjectives "first," "second," "third," etc., to describe a common object merely indicates that different instances of like objects are being referred to and are not intended to imply that the objects so described must be in a given sequence, either temporally, spatially, in ranking, or in any other manner.

As used herein, unless otherwise specified, the term "device" refers, in general, to an electronic communication device, both wired and wireless, and more particularly to one or more of the following: a portable electronic device, a telephone (e.g., cellular phone, smartphone), a computer (e.g., laptop computer, tablet computer, desktop computer, wearable computer), a connected camera or viewing device, SmartBoards (e.g., interactive boards), projected/virtual keyboards, motion sensitive systems (e.g., Microsoft Kinect), a portable media player, a personal digital assistant (PDA), a kiosk computer for public use, entertainment/gaming system, web-enabled television or entertainment device, or any other electronic device having a networked capability.

As used herein, unless otherwise specified, the term "server" may refer to any computing device having a networked connectivity and configured to provide one or more dedicated services to clients, such as a mobile device or camera. The services may include storage of data or any kind of data processing. One example of a central server may include a web server hosting one or more web pages. Some examples of web pages may include social networking web pages. Another example of a server may be a cloud server that hosts web services for one or more computer devices.

Embodiments of the present disclosure are directed to, among other things, systems and methods for monitoring waste, and more specifically, to systems and methods for monitoring waste levels, waste types or waste items, and other metrics of waste placed in waste dumpsters, such as opentop waste dumpsters. Embodiments of the disclosure may identify prohibited waste items or potential hazards, such as persons in or near a waste container, and may trigger one or more notifications based at least in part on identified items or hazards. Notifications in such instances may include text messages, email messages, or other notifications to a hauling company that a person or other hazard is in or near the waste container. Some embodiments may include electronic message boards or signs, or a speaker, at the waste container area that indicate presence of a hazard or otherwise alert the hauling company or another user to the presence of the hazard, so as to avoid potential injury to person or property. Certain embodiments may monitor waste levels in waste containers and may schedule waste hauling or waste pickup based at least in part on waste levels and a predetermined waste level threshold.

The systems and methods described herein may monitor the amount of waste placed in an opentop dumpster and may trigger automatic waste pickups based on waste level thresholds established by an operator or user of the dumpster. The systems and methods described herein may further monitor waste contents, including types of waste, deposited into the dumpster and may provide notifications, such as electronic messages and/or audible alarms, when an unwanted or restricted item is placed into the dumpster. The systems and methods described herein may further monitor and/or identify users that deposit waste into the dumpster via a variety of methods. Such monitoring may include flagging users or unknown persons who place waste into the dumpster, for example by capturing images or video or other information of users based on motion detected about a waste container. The systems and methods described herein may also allow for tolerance in positioning of the dumpster when the dumpster is emptied and replaced at or near its original location upon completion of a waste pickup or waste hauling event.

The systems and methods described herein may result in reduced costs associated with waste removal, as waste pickups may be triggered upon waste levels reaching a predetermined threshold in a waste container, rather than at regularly scheduled time intervals without regard to the level of waste in the dumpster. Further, the systems and methods described herein may prevent fines and/or penalties for improper waste dumping by identifying restricted objects placed in the dumpster and identifying the user responsible. Similarly, the systems and methods described herein may prevent fines and/or penalties for overfilled dumpsters by ensuring a waste hauling call, such as by automatic triggering, and/or by providing a notification to an operator or user. Systems and methods may further identify potential hazards, such as persons in or near a waste container, to prevent injury.

The systems and methods described herein may include a waste container and a monitoring device. The waste management system may include a waste container, such as an opentop dumpster. The opentop dumpster may be of any size or geometry, such as a commercial waste container or a residential waste container. The monitoring device may be, for example, a camera, a video camera, a smart camera, or another electronic device capable of viewing the waste container.

The monitoring device may be configured and/or positioned to monitor the waste container, such that a fill level and/or contents of the waste container may be visible to the monitoring device or otherwise within a field of view of the monitoring device. The monitoring device may also record images of the container and communicate the images to a system which may compare the images against representative images to determine a fill level of the waste container and/or to determine whether any waste contents are restricted. The monitoring device may be communicatively coupled to a network and may be configured to automatically trigger a notification or an alert, such as a waste pickup notification or a restricted item notification that may be transmitted or sent to an owner or operator of the waste container. In other embodiments, notifications and/or alerts may be transmitted or otherwise sent to a manager. For example, in instances where a waste container is owned by a third party, the waste management system described herein may be configured to communicate with a manager of the third party. In some instances, the manager of the third party may be an owner of the waste management system described herein and may be onsite, or the manager of the third party may be remotely located at the third party or elsewhere and may receive notifications and/or alerts directly. Such communication may facilitate a notification and/or alert an appropriate waste collector or lowest cost vendor, whereas other embodiments may notify and/or alert either a facilities manager or the waste hauling company directly without a middleman.

The waste management system may also include an electronic device capable of identifying users that approach and/or deposit waste into the waste container, and may record identifying information or may transmit the identifying information to another computer via a network. The waste management system may further, upon determining the approach of a user within a proximity of the waste management system, identify one or more mobile devices associated with the user and communicate a notification to one or both of another computer via a computer network and the user's mobile device(s).

Referring now to FIG. 1, one embodiment of a waste management system 100 is illustrated. The waste management system 100 may include an opentop dumpster 110, a camera system 120, a user monitoring system 140, and a waste management device 200. The opentop dumpster 110 may be a thirty cubic yard commercial dumpster with an "open" or uncovered top, or any sized opentop dumpster. The camera system 120 may include a camera 124 with a field of vision 126. The camera 124 may be positioned on an elevated structure 122, such that the field of vision 126 of the camera 124 includes visibility into some or all of the opentop dumpster 110. The camera 124 may be rotatably mounted (with one or more degrees of freedom, e.g., rotation about one or two axes) 128 on the elevated structure 122 such that the field of vision 126 of the camera is dynamic. In instances where the opentop dumpster 110 is not placed in exactly the same location between waste pickups, the camera 124 may accommodate by either rotating or by having a wide field of vision 126 (e.g., a wide angle lens, a fisheye lens, a compound lens or the like). In other embodiments, the camera 124 may not include the elevated structure and may be mounted on a wall, for example. The camera 124 may be communicatively coupled to a network 160, for example via wireless communication 162, such as WiFi, BLUETOOTH™, NFC, RFID, or the like, or a wired connection. The camera 120 may be continuously operational so as to generate a video recording, or may take pictures periodically. In some instances, the camera 120 may be triggered to operate based on a notification from the user monitoring system 140, as described below. In other embodiments, the camera may be triggered by an associated sensor, for example a motion sensor, heat sensor, RFID/NFC sensor, or the like, as described herein. In some embodiments, the camera may be mounted to the dumpster itself (or to an arm or the like attached to the dumpster and, optionally, rotatably or extendably configured for positioning from a secured position to a monitoring position). In other embodiments, the camera may be mounted to a building or other surface near the dumpster and may be positioned such that the camera has a field of vision into the dumpster (e.g., the camera may be wall mounted at a relatively higher vertical position than a top of the dumpster).

The waste management device 200 may also be connected to the network 160, for example by wireless connection 163, and may be configured to provide an input/output interface for users of the waste management system 100. The waste management device 200 may be communicatively coupled to the camera system 200 and the user monitoring system 140 for example via network 160 or another wireless or wired connection. The waste management device 200 may be used to control various aspects of the waste management system 100.

The user monitoring system 140 may include a motion sensor 142 and a communication device 144, for example a device configured to communicate over BLUETOOTH™, NFC, RFID, or any wireless communication such as via network 160. The user monitoring system 140 may detect the presence of a user 150 at or approaching the opentop dumpster 110, or as the user 150 comes within a predetermined proximity of the opentop dumpster 110. The user 150 may have an identifier 152 positioned at or on the user 150. For example, the identifier 152 may be an encoded work badge or ID, a mobile device such as a smartphone, a smart fob, or another identifier 152 associated with the user. The user monitoring system 140 may emit a beacon periodically, or may transmit a beacon or other request upon activation of the motion sensor 142. For example, as the user 150 approaches the opentop dumpster 110, the user 150 may come into the triggering range of the motion sensor 142. The motion sensor 142 may be communicatively coupled to the communication device 144 of the user monitoring system 140, and may notify the communication device 144 of the presence of the user 150. The communication device 144 may receive the notification from the motion sensor 142 and may emit a beacon in an attempt establish a connection with and/or to identify the user 150. The identifier 152 of the user 150 may receive the beacon or other transmission from the communication device 144 of the user monitoring system 140 and, in response, may transmit identification information, such as name, phone number, employee identification number, or other identification information, to the user monitoring system 140. The user monitoring system 140 may receive and, in some embodiments, store and/or transmit the identification information to another computer. In some embodiments, the user monitoring system 140 may establish a geofence 130 about the opentop dumpster 110 and may transmit a beacon or message to any compatible electronic devices within the geofence requesting identification information. In some embodiments, the sensor may be able to determine the mobile number of the user such that the system can communicate with that user via, for example SMS/MMS.

Upon detecting the user 150, the user monitoring system 140 may also transmit a notification to the camera system 120, for example via network 160. The camera system 120 may receive the notification and may initiate the camera 124. In other embodiments, the camera 124 may be in continuous operation. The camera 124 may collect one or more images of the contents 112 of the opentop dumpster 110. The camera 124 may analyze the level of waste in the opentop dumpster 110 to determine if the level exceeds a predetermined fill level, for example represented by dashed line 114. In some embodiments the camera 124 may use a virtual line positioned at a desired fill level of the opentop dumpster, for example 75%, 80%, 90%, or any adjustable fill level determined by the owner of the dumpster. In other embodiments, the camera 124 may analyze the fill level with respect to an upper edge 116 or other mark of the opentop dumpster 110. If the fill level exceeds the predetermined fill level, the camera system 120 may initiate a waste pickup by, for example, transmitting a notification or alert to a waste hauler service provider system, as described below. In other embodiments, the camera system 120 may notify personnel or trigger an operator alert, including an audible alarm, for manual inspection of the fill level of the opentop dumpster 110. Notifications may include images and/or video recording of a waste container. The camera system 120 may notify personnel or trigger an operator alert by transmitting a notification or message to the waste management device 200, for example via network 160.

The camera system 120 may also provide alerts or notifications at desired fill levels, for example the camera system 120 may notify the operator by sending a notification to the waste management device 200 when the opentop dumpster 110 is approximately half full. Moreover, the system may be capable of monitoring the fill level across the opentop container such that it can provide advice about where, along the length of the container, to place waste so as to achieve a uniform degree of fullness (i.e., maximize the waste in any given pickup).

The camera system 120 may also transmit captured images of the contents 112 of the opentop dumpster 110 to another computer, for example the waste management device 200 or another server, for analysis of the waste contents 112. In some embodiments, the camera system 120 may analyze the waste contents locally. The waste management device 200 may receive the images from the camera system 120 and may analyze the waste contents using image recognition, pattern recognition, optical character recognition, or another visual based recognition methodology to determine particulars of the waste content 112. For example, the computer may determine if any of the waste content 112 is a restricted and/or illegal waste item. The computer may compare recognized patterns or images to a known image database, for example, to determine if any waste contents do not belong in the opentop dumpster 110. The known image database may be updated and/or maintained by the operator of the waste management system 100. The known image database may include prohibited items, illegal items, or other undesired items.

In FIG. 1, for example, the camera system 120 may send an image of the opentop dumpster 110 to the waste management device 200 via network 160. The computer may recognize or otherwise identify a tire 118 and a car battery 119 in the waste content 112. The computer may determine that the car battery 119 and tire 118 are prohibited items. The computer may transmit a notification to the operator of the waste management system 100, along with user identification information, if any, collected by the user monitoring system 140 at the time the tire 118 and/or car battery 119 were deposited into the opentop container 110. The operator may then take necessary action, such as reprimanding the offending user 150 and/or removing the prohibited items prior to waste pickup. The computer may also analyze the image to determine a fill level, as discussed above, of the opentop dumpster 110, and based at least in part on the determined fill level, initiate a response action. For example, if the opentop container 110 is 90% full, the computer may request a waste pickup and also alert the operator that the opentop dumpster 110 is close to overflowing. Similarly, the computer system can be configured to account for particular requirements for particular opentop containers. For example, some containers may be designated as paper and cardboard recycling containers. As such, the system described herein can be used to help monitor that only paper and cardboard are deposited within such a container.

In some embodiments, multiple waste containers may be included in the waste management system 100. In these embodiments, the waste management system 100 may be configured to allow one waste container to fill to a high capacity, for example 95%, without triggering a waste pickup action, as long as another waste container has a predetermined level of unused space. For example, a waste pickup action may not be triggered until one waste container is 95% full and the second waste container is 75% full, thereby maximizing utilization of the waste containers.

Figure 2:
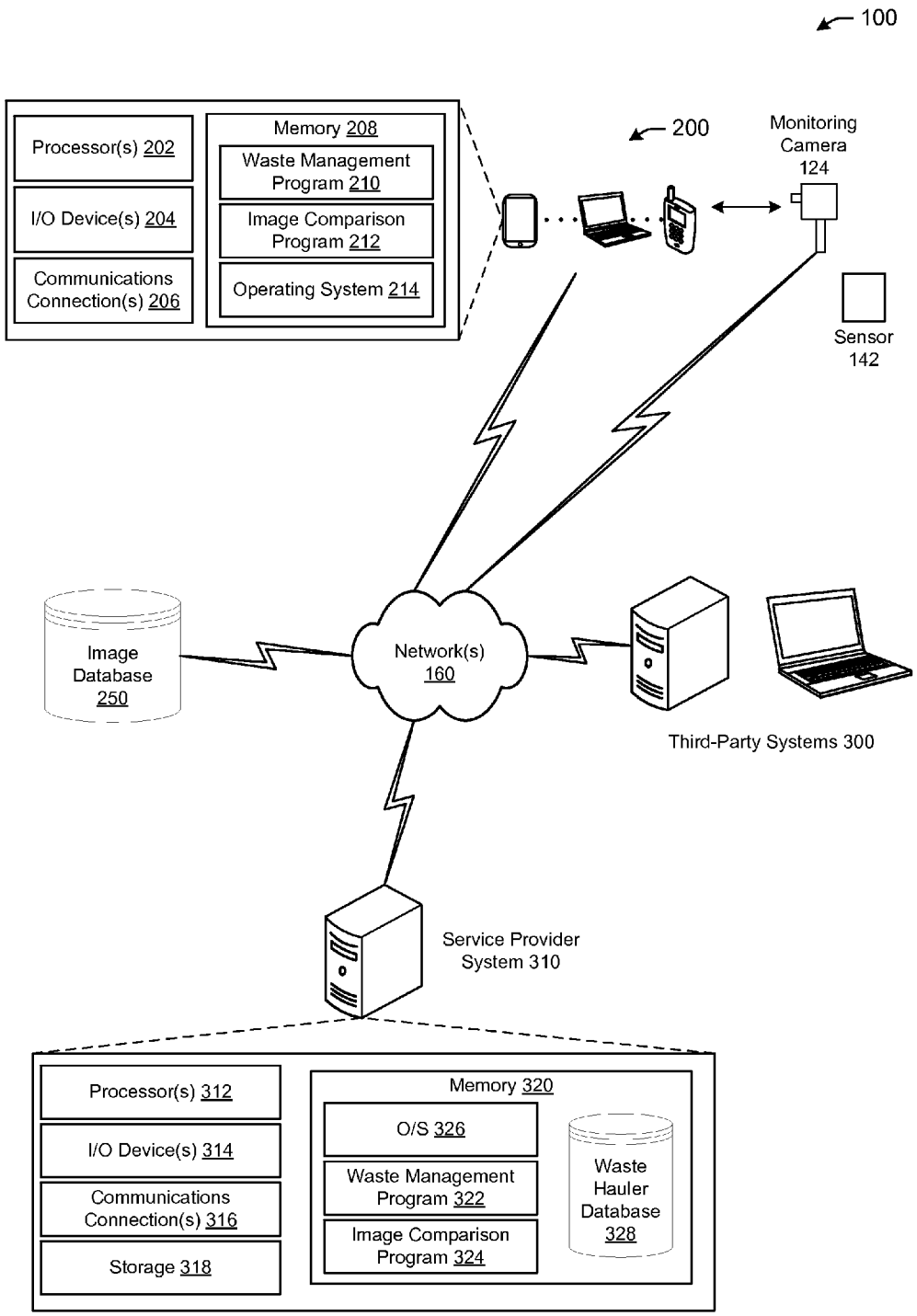
FIG. 2 is an illustration of a waste monitoring network, according to an embodiment of the disclosure.

Referring now to FIG. 2, another embodiment of the waste management system 100 is schematically depicted. The waste management system 100 includes the camera 124 of the camera system 120, the waste management device 200, motion sensor 142 of the user monitoring system 140 discussed above, an image database 250, a third party system(s) 300, and a service provider system 310. Additional or fewer components may be included in the waste management system, although only certain components are illustrated in this embodiment. Each component of the waste management system 100 may be communicatively coupled via network 160. In other embodiments, some or all components of the waste management system 100 may be connected via wired connections.

The waste management device 200 may be a mobile device and may include one or more processor(s) 202, an input/ output device 204, and one or more communication connection(s) 206. The processor 202, I/O device 204, and communication connections 206 may be communicatively coupled to one or more memory storage units 208. The memory 208 may include a waste management program 210, an image comparison program 212, and an operating system 214. The I/O device 204 may allow a user of the waste management device 200 to input commands or configure the waste management system 100, for example via the operating system 214 or a guided user interface. The communication connection 206 may be configured to transmit and/or receive data, for example from other components of the waste management system 100. The waste management program 210 may include aspects of the waste management system 100 and may be a separate application on the waste management device 200. The waste management program 210 may be communicatively coupled to the image comparison program 212 and/or the operating system 214. The image comparison program 212 may be configured to analyze or compare images received from the camera 124 with images stored in the image database 250, for example.

Components of the system 100 may be in communication via one or more networks 160. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The image database 250 may be connected to the network 160 and may include a database of images or links to images, for example images associated with different fill levels of waste containers, images associated with different types of waste containers, images associated with prohibited and/or restricted items, and other images that may be used or analyzed by the waste management system 100. The image database 250 may be updated by data received from the waste management device 200, for example. In other embodiments, the image database 250 may be stored locally at the waste management device 200.

The waste management system 100 may include a third-party system 300. The third party system 300 may be connected to one or more components of the waste management system 100 via network 160 or another wireless or wired connection. The third party system 300 may be, for example, a security guard system that receives notifications from the waste management device 200 or the camera 124 when a prohibited item is identified in the waste container. Other examples of the third party system include law enforcement systems, waste hauler systems, and other systems that may receive notifications from the waste management device 200 or another component of the waste management system 100.

The service provider system 310 may include one or more processor(s) 312, an input/output device 314, one or more communication connection(s) 316, and storage 318. The processor 312, I/O device 314, communication connections 316, and storage 318 may be communicatively coupled to one or more memory(ies) 320. The memory 320 may include a waste management program 322, an image comparison program 324, an operating system 326, and a waste hauler database 328. As described above with respect to the waste management device 200, the I/O device 314 may allow a user of the service provider system 310 to input commands or configure the service provider system 310, for example via the operating system 326 or a guided user interface. The communication connection 316 may be configured to transmit and/or receive data, for example from other components of the waste management system 100. The waste management program 322 may include aspects of the waste management system 100 and may be a separate application on the service provider system 310. The waste management program 322 may be communicatively coupled to the image comparison program 324 and/or the operating system 326. The image comparison program 324 may be configured to analyze or compare images received from the camera 124 with images stored in the image database 250, for example.

The memory devices 208, 320 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory devices 208, 320 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory devices 208, 320 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 318 may include removable storage and/or non-removable storage including, but not limited to, magnetic storage, optical disk storage, and/or tape storage. The data storage 318 may provide non-volatile storage of computer-executable instructions and other data. The memory devices 208, 320 and the data storage 318, removable and/or non-removable, are examples of computer-readable storage media (CRSM) as that term is used herein.

The data storage 318 may store computer-executable code, instructions, or the like that may be loadable into the memory 320 and executable by the processor(s) 312 to cause the processor(s) 312 to perform or initiate various operations. The data storage 318 may additionally store data that may be copied to memory 320 for use by the processor(s) 312 during the execution of the computer-executable instructions. Moreover, output data generated as a result of execution of the computer-executable instructions by the processor(s) 312 may be stored initially in memory 320, and may ultimately be copied to data storage 318 for non-volatile storage.

More specifically, the data storage 318 may store one or more operating systems (O/S) 326; and one or more program modules, applications, or the like. Further, any data stored in the data storage 318 may be loaded into the memory 320 for use by the processor(s) 312 in executing computer-executable code.

The processor(s) 312 may be configured to access the memory 320 and execute computer-executable instructions loaded therein. The processor(s) 312 may include any suitable processing unit capable of accepting data as input, processing the input data in accordance with stored computer-executable instructions, and generating output data. The processor(s) 312 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 312 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 312 may be capable of supporting any of a variety of instruction sets.

Referring now to other illustrative components depicted as being stored in the data storage 318, the O/S 326 may be loaded from the data storage 318 into the memory 320 and may provide an interface between other application software and hardware resources. The O/S 326 may include any operating system now known or which may be developed in the future including, but not limited to, any server operating system, any mainframe operating system, or any other proprietary or non-proprietary operating system.

Referring now to other illustrative components of the system, one or more input/output (I/O) interfaces 314 may be provided that may facilitate the receipt of input information from one or more I/O devices as well as the output of information from a device to the one or more I/O devices. The I/O devices may include, for example, one or more user interface devices that facilitate interaction between a user and a device including, but not limited to, a display, a keypad, a pointing device, a control panel, a touch screen display, a gesture capture or detection device, a remote control device, a microphone, a speaker, and so forth. The I/O devices may further include, for example, any number of peripheral devices such as data storage devices, printing devices, and so forth.

Various program module(s), script(s), plug-in(s), Application Programming Interface(s) (API(s)), or any other suitable computer-executable code hosted locally on the system, and/or hosted on other computing device(s) accessible via one or more networks, may be provided to support functionality provided by the program modules, applications, or computer-executable code and/or additional or alternate functionality. Further, functionality may be modularized differently such that processing described as being supported collectively by the collection of program modules may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules may be implemented, at least partially, in hardware and/or firmware across any number of devices.

It should further be appreciated that the system may include alternate and/or additional hardware, software, or firmware components beyond those described or depicted without departing from the scope of the disclosure. More particularly, it should be appreciated that software, firmware, or hardware components depicted as forming part of the system are merely illustrative and that some components may not be present or additional components may be provided in various embodiments. While various illustrative program modules have been depicted and described as software modules stored in data storage 318, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

The service provider system 310 may include the waste hauler database 328. The waste hauler database 328 may include data or information associated with one or more waste haulers, for example contact information, pricing, availability or scheduling, and other waste hauler information. The service provider system 310 may be configured to receive a waste pickup notification from the waste management device 200 and to analyze the waste hauler database 328 to identify a waste hauler and/or schedule a waste pick up.

In an illustrative example, the sensor 142 may detect a user around an opentop dumpster. The sensor 142 may notify the camera 124 of the user presence by sending a trigger to the camera 124 via network 160. The camera 124 may receive the trigger from the sensor 142 and may begin capturing images and/or video of the opentop dumpster. The camera 124 may transmit the captured images to the waste management device 200 via network 160. The waste management device 200 may receive the captured images from the camera 124 and, using the waste management program 210 and/or the image comparison program 212, may communicate with the image database 250 to determine a fill level of the opentop dumpster and/or analyze the waste contents of the opentop dumpster. The waste management device 200 may analyze the captured images, and in instances where prohibited items are identified in the opentop dumpster, may transmit an alert to an operator of the opentop dumpster, a security service provide, or another third party system 300. The waste management device 200 may also transmit a copy of the image with the prohibited item along with user identification captured from sensor 142.

Based at least in part on the analysis of the captured images received from the camera 124, the waste management device 200 may also determine a fill level of the opentop dumpster. If the fill level exceeds a predetermined threshold, the waste management device 200, using communication connection 206, for example, may transmit a notification to the service provider system 310 indicating that the opentop dumpster is ready for waste pickup. The service provider system 310 may receive the notification from the waste management device 200 and may identify a waste hauler, selected from the waste hauler database 328, based at least in part on scheduling availability, pricing, or other factors. The service provider system 310 may then automatically schedule a waste pickup for the opentop dumpster, for example by electronically placing an order or transmitting data to the identified waste hauler. In other instances, the third party system 300 may be the waste hauler, and the waste management device 200 may schedule the waste pickup. The waste hauler may then empty the opentop dumpster.

Figure 3:
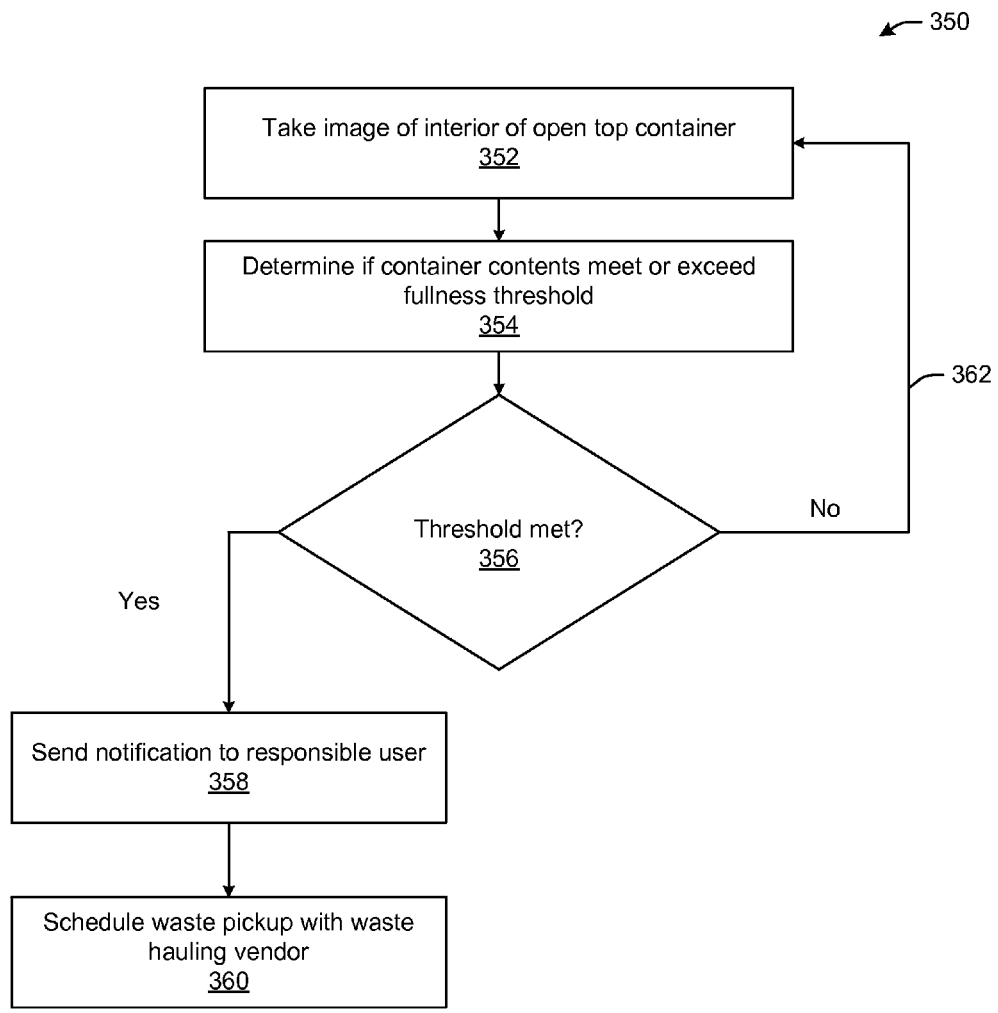
FIG. 3 is an example data flow of a waste monitoring system, according to an embodiment of the disclosure.

Referring now to FIG. 3, and example logic chart of a method of managing waste 350 is depicted. At block 352, an image is taken of an interior of an opentop container. At block 354, a determination is made whether the container meets or exceeds a fullness threshold. At decision 356, if the threshold is met, a notification is sent to the responsible user at block 358. A waste pickup is then scheduled with a waste hauling vendor at block 360. At decision 356, if the threshold is not met, the fullness level of the container is continued to be monitored at block 362.

Figure 4:
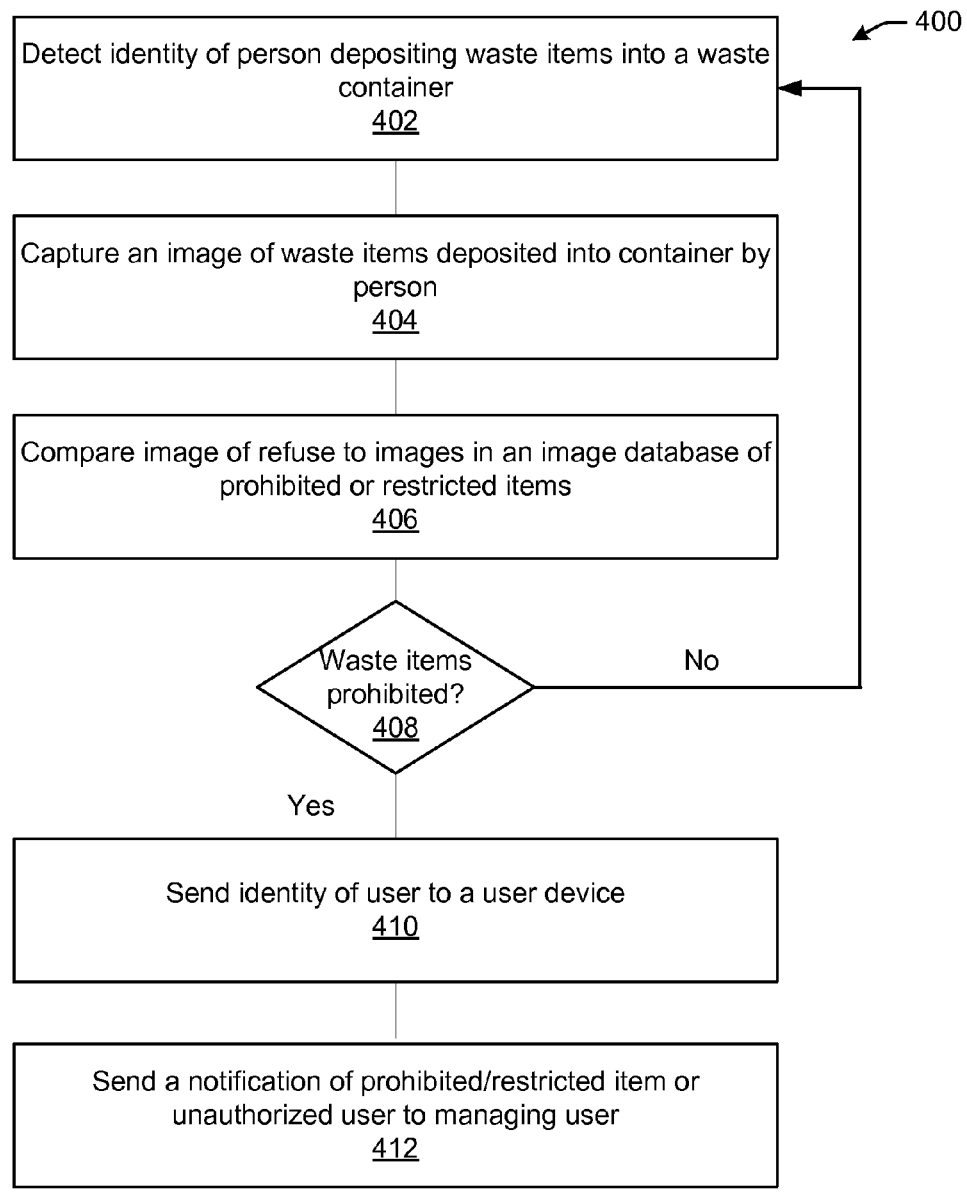
FIG. 4 depicts an example method of monitoring waste, according to an embodiment of the disclosure.

Referring now to FIG. 4, a method of managing waste 400 is provided. At block 402, an identity of a person depositing waste items into a container is detected, for example, via RFID or mobile device identification. Block 404 includes capturing an image of the waste items deposited or to be deposited into the waste container. At block 406, the captured image is compared to one or more images in an image database of prohibited or restricted items. At determination block 408, a determination of whether the deposited waste items are prohibited is made by one or more modules of a computer system of the system. If the waste items are not prohibited, the method 400 may continue to block 402. If the waste items are prohibited, or if the determination at block 408 is positive, the method 400 may proceed to block 410, at which an indication of the identity of the user may be sent, for example to a third party, another computer, a user device, the system of the operator of the opentop container, or another computer system. At block 412, a notification is sent of the prohibited or restricted item or unauthorized user to a managing user. Notifications may include text messages, emails, audible alarms, or other notifications. It should be understood that in some embodiments, not all of these steps will be practiced. For example, the system may not include a sensor or device for identifying a user, and therefore may not determine the user's identity and communicate that to the managing user.

Figure 5:
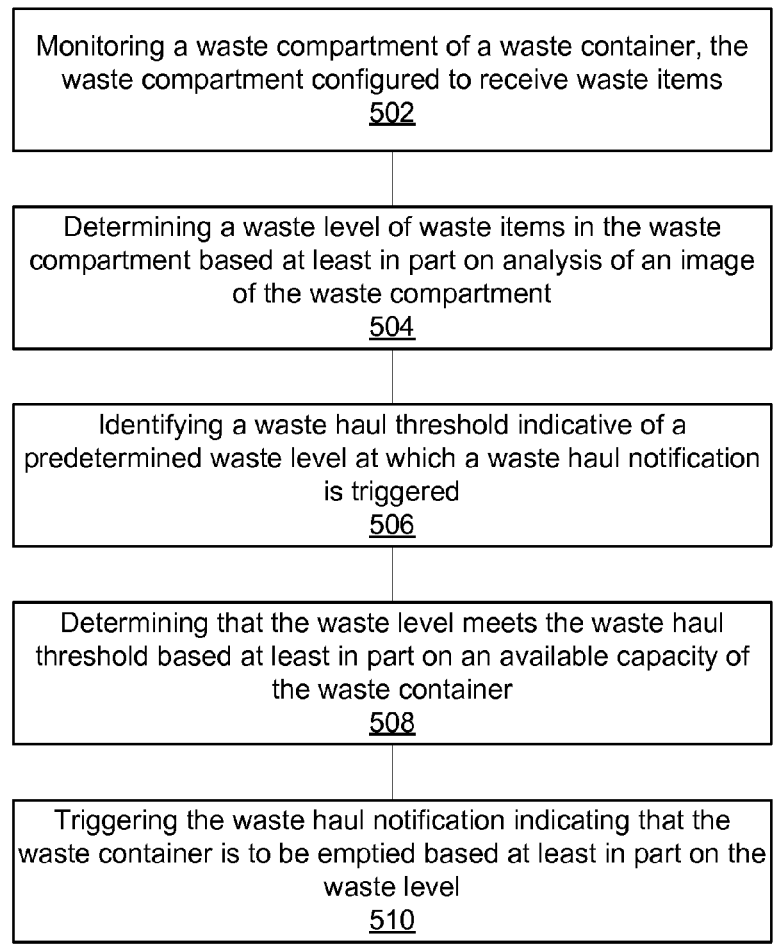
FIG. 5 depicts an example process flow for monitoring waste, according to an embodiment of the disclosure.

Referring to FIG. 5, an example process flow 500 is depicted. Block 502 of the process flow 500 may include monitoring a waste compartment of a waste container, the waste compartment configured to receive waste items. Block 504 may include determining a waste level of waste items in the waste compartment. Block 506 may include identifying a waste haul threshold indicative of a predetermined waste level at which a waste haul notification is triggered. The waste haul threshold may be, in one example, a height of the waste level relative to a height of the waste compartment. In some embodiments, the waste haul threshold may be based at least in part on an unfilled capacity of the waste container. For example, embodiments of the disclosure may determine an unfilled capacity of a waste compartment by comparing the waste level to the waste haul threshold. Certain embodiments may generate a percentage available capacity by calculating an unfilled volume of the waste compartment by computer modeling or triangulating certain points of a top layer of waste with respect to a maximum fill level of a waste container. Some embodiments may further generate an estimated time that a waste container will be filled based at least in part on historical data related to fill levels, fill events or user interactions at the waste container, and other information.

Block 508 may include determining that the waste level meets the waste haul threshold. Block 510 includes triggering the waste haul notification indicating that the waste container is to be emptied based at least in part on the waste level. In some embodiments, triggering the waste haul notification may include automatically scheduling a waste haul pickup with a waste hauler to empty the waste container. For example, embodiments may place waste haul orders or send notifications with pickup instructions to one or more waste hauling service providers.

Upon completion of a waste haul pickup, embodiments of the disclosure may refocus a camera to capture a waste container and surrounding perimeter. In some instances, a waste container may not be placed in its original location after a waste haul pickup. Accordingly, embodiments of the disclosure may automatically identify waste container positioning and may detect motion within a surrounding perimeter to determine presence of moving objects (e.g., people, animals, etc.). For example, if a person is dwelling around or otherwise loitering near a dumpster or waste container, embodiments of the disclosure may prevent a waste hauling so as to avoid injury to the person. In one example method, certain embodiments may determine a first location of the waste container. Upon completion of a waste haul pickup, embodiments may determine a second location of the waste container that is different than the first location. Upon determining the second location, the waste haul threshold may be updated based at least in part on the second location of the waste container. Further, a perimeter surrounding the waste container may be adjusted according to the second location. In one example, a camera of the system may be reoriented so as to position the waste container within the camera's field of vision in the second location.

Embodiments of the disclosure may detect motion about a waste container. For example, a motion sensor may be used to detect motion and/or trigger a camera associated with a system. In one embodiment, a system may detect motion about a waste container, and as a result, the system may trigger or otherwise initiate recording of a video of the waste container. Systems may further identify a user device positioned about the waste container based at least in part on the detected motion.

As discussed herein, embodiments of the disclosure may detect one or more prohibited items among the waste items of a waste container. In one example embodiment, a method may include identifying a first waste item positioned in the waste compartment, determining that the first waste item is a prohibited waste item, such as a person, a tire, a car battery, can of paint/stain, container of solvent or industrial chemical, or other item, and triggering a prohibited item notification based at least in part on the first waste item. For example, the system may compare an image of the first waste item to a database comprising images of prohibited items. Prohibited item notifications may include audible alarms, visual notifications, email messages, text messages, images, videos, or other notifications. In some instances, for example when a person or moving object may be detected about a waste container, systems and methods may wait a predetermined length of time before sending a prohibited item notification. For example, if a person is detected by a system of the disclosure for a length of 1 minute or 5 minutes, etc., the system may trigger a prohibited item notification upon completion of the predetermined time interval, so as to prevent or avoid premature notifications. In some embodiments, an intercom system with a speaker may be located at or adjacent to monitored opentop containers so as to facilitate immediate communication and/or remediation when prohibited items are placed into the container or other hazards are identified.

Figure 6:
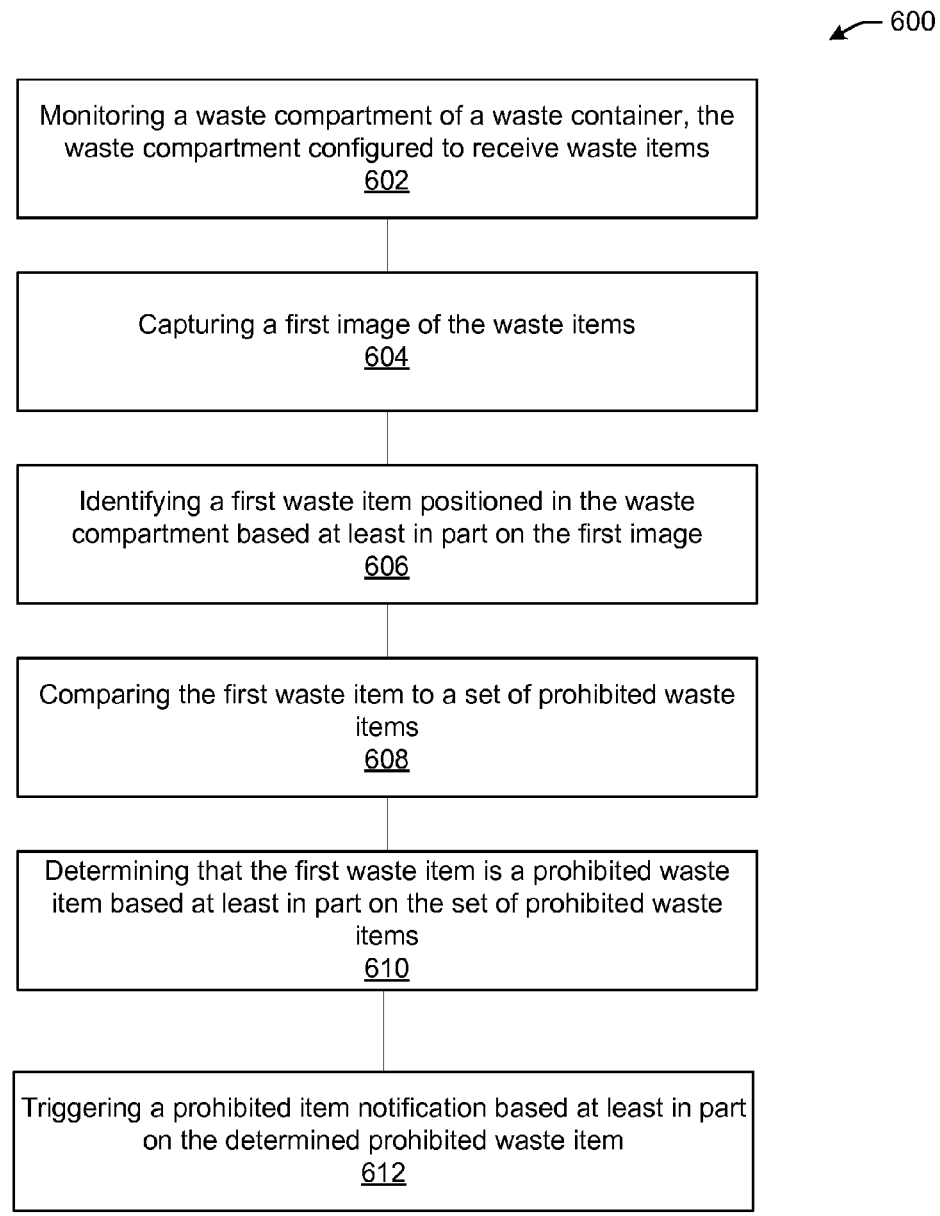
FIG. 6 depicts an example process flow for monitoring waste, according to an embodiment of the disclosure.

Referring to FIG. 6, an example process flow 600 is depicted. At block 602, the process flow 600 includes monitoring a waste compartment of a waste container, the waste compartment configured to receive waste items. Block 604 includes capturing a first image of the waste items. Block 606 includes identifying a first waste item positioned in the waste compartment based at least in part on the first image. Block 608 includes comparing the first waste item to a set of prohibited waste items. Block 610 includes determining that the first waste item is a prohibited waste item based at least in part on the set of prohibited waste items. Block 612 includes triggering a prohibited item notification based at least in part on the determined prohibited waste item.

In some embodiments, a waste haul pickup may have been scheduled with a waste hauler to empty the waste container. Embodiments may capture a second image of the waste items upon scheduling the waste haul pickup, and may determine that a second prohibited waste item is in the waste compartment based at least in part on the second image. As a result, the system may cancel the waste haul pickup.

Figure 7A:
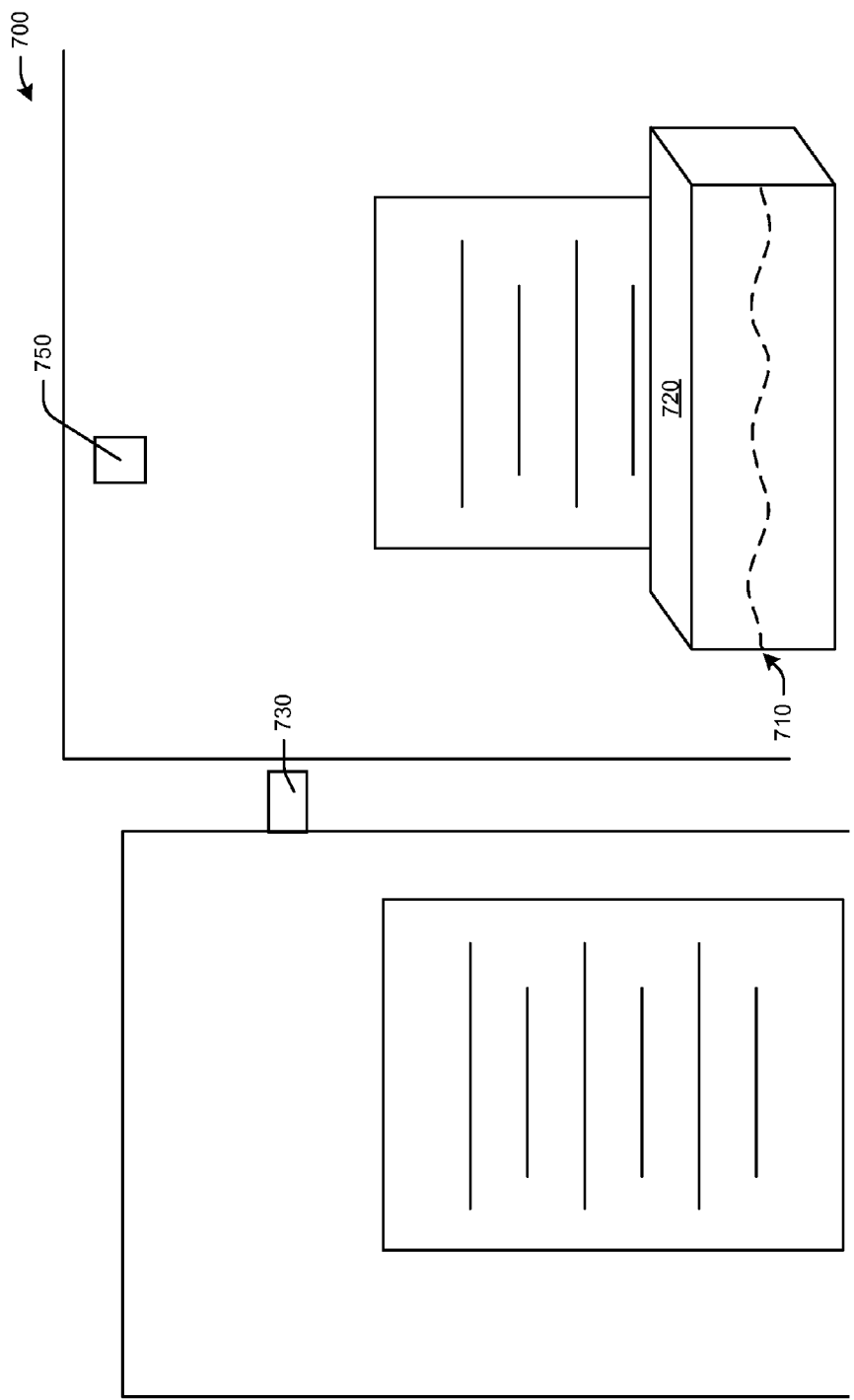
FIGS. 7A-7B depicts an example system for monitoring waste, according to an embodiment of the disclosure.
Figure 7B:
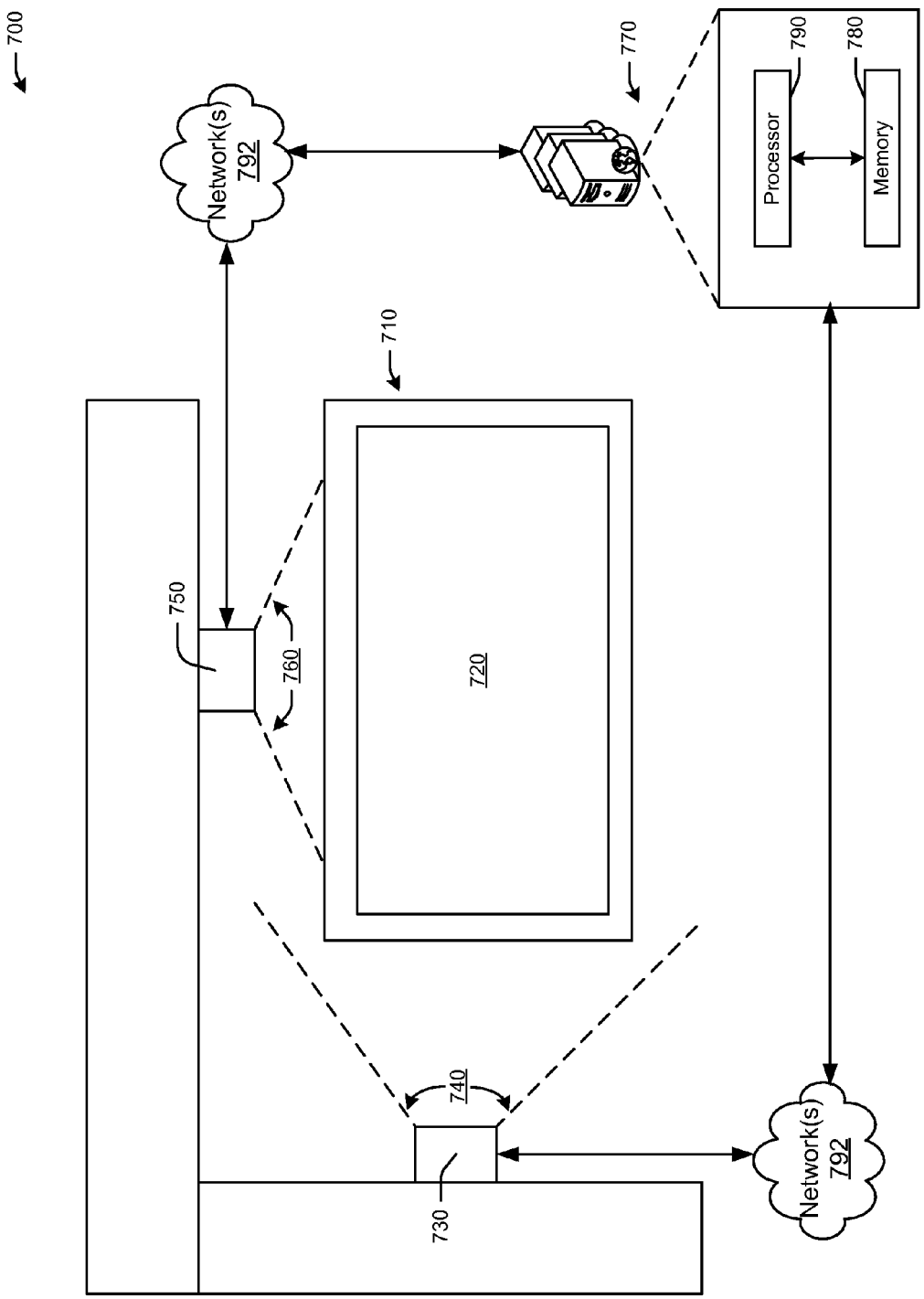

Referring now to FIGS. 7A and 7B, an example system 700 is illustrated in top and perspective views. The system 700 may include a waste container 710 with a waste compartment 720 configured to receive waste items, a first camera 730 having a first field of vision 740 mounted such that the waste compartment 720 is in the first field of vision 740, and a second camera 750 having a second field of vision 760 mounted such that the waste compartment 720 is in the second field of vision 760. The first and second cameras 730, 750 may be elevated and oriented so as to capture the waste container 710 and a surrounding perimeter. The first and second cameras 730, 750 may have tilt, pan, and/or zoom functionality. The second camera 750 may be oriented at an angle, such as at an acute angle or an obtuse angle, or substantially perpendicular to the first camera 730. The system 700 may include a computer system 770 with at least one memory 780 storing computer-executable instructions and at least one processor 790 communicatively coupled to the at least one memory 780 configured to execute the computer-executable instructions to monitor the waste compartment 720 via the first camera 730 and/or the second camera 750. The system 700 may determine a waste level of the waste items in the waste compartment 720 and may identify a waste haul threshold indicative of a predetermined waste level at which a waste haul notification is triggered. The system 700 may determine that the waste level meets the waste haul threshold, and may trigger the waste haul notification indicating that the waste container is to be emptied based at least in part on the waste level. In some embodiments, the system 700 may generate a three-dimensional model of the waste items in the waste compartment 720 based at least in part on images from the first camera 730 and/or the second camera 750, and may automatically schedule a waste haul pickup with a waste hauler to empty the waste container 710. In embodiments with a single camera, the camera may be configured to pan between multiple waste containers. The computer system 770 may be compartmentalized and located proximate to the container, and may be connected to the network 792 via any network communication protocol, such as cellular.

Embodiments of the disclosure may further be configured to identify types of waste in the waste compartment 720. For example, the camera 730 may determine that the waste compartment 720 includes a number of boxes, and as a result, when the waste compartment 720 meets the waste hauling threshold, systems of the disclosure may automatically trigger a waste haul pickup with a cardboard recycling service provider, because the waste compartment 720 includes recyclable boxes. Similarly, if the waste compartment 720 includes aluminum items, as determined by systems of the disclosure, an aluminum waste hauler or recycling service provider may automatically be contacted for waste hauling. In some embodiments, systems of the disclosure may trigger waste hauls or schedule waste haul events with specific waste haulers based at least in part on a position of a waste container relative to other waste containers. For example, a first waste container position may be associated with a particular waste hauler and a second waste container position may be associated with a different waste hauler. Prohibited items may include the wrong type of waste for a dedicated container. For example, waste items placed in a recycling container may be considered prohibited items, or paper products placed into an aluminum recycling container may be considered a prohibited item.

The above-described systems and methods may provide effective and efficient waste management by initiating timely waste pickup as needed based on fill level of waste containers, and may reduce costs associated with prohibited or illegal items placed by users into waste containers. The systems and methods described herein may also allow for identification and tracking of waste generation patterns and may inform waste mitigation and recycling efforts. Systems and methods described herein may further prevent and/or deter theft from or unauthorized removal of waste items, such as recyclables, from waste containers.

One or more operations of the process flows 500, 600 may have been described above as being performed by a computer system, or more specifically, by one or more program modules, applications, or the like executing on a device. It should be appreciated, however, that any of the operations of process flows 500, 600 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. The operations described and depicted in the illustrative process flows 500, 600 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in process flows 500, 600 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed:

1. A method comprising:
   monitoring, by a computer system comprising one or more processors coupled to at least one memory, a waste compartment of a waste container, the waste compartment configured to receive waste items;
   determining, by the computer system, a waste level of waste items in the waste compartment based at least in part on analysis of an image of the waste compartment;
   identifying, by the computer system, a waste haul threshold indicative of a predetermined waste level at which a waste haul notification is triggered;
   determining, by the computer system, that the waste level meets the waste haul threshold based at least in part on an available capacity of the waste container;
   determining, by the computer system, a first location of the waste container;
   triggering, by the computer system, the waste haul notification indicating that the waste container is to be emptied based at least in part on the waste level;
   determining, by the computer system, that the waste haul pickup is complete;
   determining, by the computer system, a second location of the waste container after the waste haul pickup is complete that is different than the first location; and
   updating, by the computer system, the waste haul threshold based at least in part on the second location of the waste container.

2. The method of claim 1, further comprising determining, by the computer system, an unfilled capacity of the waste compartment by comparing the waste level to the waste haul threshold.

3. The method of claim 1, wherein the waste haul threshold is indicative of a total capacity of the waste compartment compared to a filled capacity of the waste compartment.

4. The method of claim 1, further comprising:
   determining, by the computer system, a position of the waste container; and
   identifying, by the computer system, a waste hauler associated with the position;
   wherein triggering the waste haul notification comprises automatically scheduling a waste haul pickup with the waste hauler to empty the waste container.

5. The method of claim 1, further comprising:
   detecting, by the computer system, motion about the waste container; and
   recording, by the computer system, a video of the waste container.

6. The method of claim 5, further comprising identifying, by the computer system, a user device positioned about the waste container based at least in part on the detected motion.

7. The method of claim 1, further comprising:
   identifying, by the computer system, a first waste item positioned in the waste compartment;
   determining, by the computer system, that the first waste item is a prohibited waste item; and
   triggering, by the computer system, a prohibited item notification based at least in part on the first waste item.

8. The method of claim 7, wherein determining that the first waste item is a prohibited waste item comprises comparing an image of the first waste item to a database comprising images of prohibited items.

9. The method of claim 1, wherein the waste container is an opentop waste container.

10. A method comprising:
    monitoring, by a computer system comprising one or more processors coupled to at least one memory, a waste compartment of a waste container, the waste compartment configured to receive waste items;
    capturing, by the computer system, a first image of the waste items;
    identifying, by the computer system, a first waste item positioned in the waste compartment based at least in part on the first image;
    comparing, by the computer system, the first waste item to a set of prohibited waste items;
    determining, by the computer system, that the first waste item is a prohibited waste item based at least in part on the set of prohibited waste items;
    triggering, by the computer system, a prohibited item notification based at least in part on the determined prohibited waste item;
    scheduling, by the computer system, a waste haul pickup with a waste hauler to empty the waste container;
    capturing, by the computer system, a second image of the waste items upon scheduling the waste haul pickup;
    determining, by the computer system, that a second prohibited waste item is in the waste compartment based at least in part on the second image; and
    canceling, by the computer system, the waste haul pickup.

11. The method of claim 10, wherein the first waste item is one of: a tire, a person, a battery, paint or stain container, or solvent or chemical container.

12. The method of claim 10, wherein the prohibited item notification comprises at least one of an audible alarm or an electronic message.

13. A system comprising:
    a waste container comprising a waste compartment configured to receive waste items;
    a first camera having a first field of vision mounted such that the waste compartment is in the first field of vision;
    at least one memory storing computer-executable instructions; and
    at least one processor communicatively coupled to the at least one memory and configured to access the at least one memory and execute the computer-executable instructions to:
    monitor the waste compartment via the first camera;
    determine a waste level of waste items in the waste compartment;
    identify a waste haul threshold indicative of a predetermined waste level at which a waste haul notification is triggered;
    determine that the waste level meets the waste haul threshold;
    trigger the waste haul notification indicating that the waste container is to be emptied based at least in part on the waste level;
    determine a first location of the waste container;
    determine that the waste haul pickup is complete;

determine a second location of the waste container after the waste haul pickup is complete that is different than the first location; and update the waste haul threshold based at least in part on the second location of the waste container.

14. The system of claim 13, further comprising:

a second camera having a second field of vision mounted such that the waste compartment is in the second field of vision, the second camera oriented at an acute angle or at an obtuse angle with respect to the first camera;

wherein the at least one processor is further configured to execute the computer-executable instructions to:

monitor the waste compartment via the second camera;

generate a three-dimensional model of the waste items in the waste compartment based at least in part on images from the first camera and the second camera.

15. The system of claim 13, wherein the at least one processor is further configured to execute the computer-executable instructions to automatically schedule a waste haul pickup with a waste hauler to empty the waste container.

16. The system of claim 13, wherein the at least one processor is further configured to execute the computer-executable instructions to:

detect motion about the waste container; and record a video of the waste container via the first camera or the second camera.

17. The system of claim 16, wherein the at least one processor is further configured to execute the computer-executable instructions to identify one of a radio frequency identification tag or a mobile device positioned about the waste container based at least in part on the detected motion.

18. The method of claim 10, further comprising identifying, by the computer system, a user device positioned about the waste container based at least in part on the detected motion.

19. The method of claim 18, further comprising identifying, by the computer system, an employee identifier associated with the user device.

20. The method of claim 10, further comprising identifying, by the computer system, a smartphone positioned about the waste container.

* * * * *